A high speed data packet switch comprising input and output ports and a switch fabric to link each input port to each output port wherein each connection between input and output ports comprises a dynamic buffer memory for storing at least one data packet for a minimum specified storing time is disclosed. When a data packet is received through an input port, it is written in all individual dynamic memory buffers connected to this input port so as to have a copy of the incoming data packet ready to go through any output port to support unicast, multicast and broadcast traffic. Given the architecture of the data packet switch and its control algorithm, dynamic memory buffers neither need to be refreshed nor their contents have to be restored after reading.

(12) United States Patent
Glaise et al.

(10) Patent No.: US 7,289,523 B2
(45) Date of Patent: Oct. 30, 2007

(54) DATA PACKET SWITCH AND METHOD OF OPERATING SAME

(75) Inventors: Rene Glaise, Nice (FR); Alain Blanc, Tourettes sur Loup (FR); Francois Le Maut, Avenue de la Lanterne (FR); Michel Poret, Gattieres (FR)

(73) Assignee: International Business Machines Corporation, Armonk, NY (US)

( * ) Notice: Subject to any disclaimer, the term of this patent is extended or adjusted under 35 U.S.C. 154(b) by 1021 days.

(21) Appl. No.: 10/243,294

(22) Filed: Sep. 12, 2002

(65) Prior Publication Data
US 2003/0048787 A1    Mar. 13, 2003

(30) Foreign Application Priority Data
Sep. 13, 2001    (EP)    .................................. 01480084

(51) Int. Cl.
*H04L 12/28*    (2006.01)
*H04J 3/06*    (2006.01)
(52) U.S. Cl. .................. 370/413; 370/419; 370/509
(58) Field of Classification Search ................ 370/351, 370/358, 360, 363, 379, 382, 386, 389, 390, 370/391, 392, 412, 413, 414, 510, 419, 509
See application file for complete search history.

(56) References Cited

U.S. PATENT DOCUMENTS

| | | | | |
|---|---|---|---|---|
| 5,487,030 A | * | 1/1996 | Drab et al. .................. | 365/145 |
| 5,966,318 A | * | 10/1999 | Ramer et al. ................ | 365/145 |
| 6,122,251 A | * | 9/2000 | Shinohara .................... | 370/231 |
| 6,226,292 B1 | * | 5/2001 | DiPlacido ................. | 370/395.7 |
| 6,542,502 B1 | * | 4/2003 | Herring et al. ............. | 370/390 |
| 6,778,548 B1 | * | 8/2004 | Burton et al. ................ | 370/429 |
| 6,865,155 B1 | * | 3/2005 | Wong et al. ................. | 370/235 |
| 7,016,349 B1 | * | 3/2006 | Raza et al. .................. | 370/390 |

OTHER PUBLICATIONS iSLIP: A scheduling algorithm fo rinput-queued switches, IEEE/ACM Transactions on Networking, vol. 7, No. 2, pp. 188-201, Apr. 1999 by N. McKeown.
VITESSE Semiconductor Corporation (741 Calle Plano, Camarillo, CA 93012.

* cited by examiner

*Primary Examiner*—Hanh Nguyen
(74) *Attorney, Agent, or Firm*—Pastel Law Firm; Christopher R. Pastel

(57) ABSTRACT

10 Claims, 6 Drawing Sheets

Prior Art

DATA PACKET SWITCH AND METHOD OF OPERATING SAME

This application claims priority from European Patent Office (EPO) Application 01480084.1 filed on Sep. 13, 2001.

FIELD OF THE INVENTION

The present invention relates to high speed packet switching in general and, is more particularly concerned with a system and method to switch packets at high speed through a dynamic memory array.

BACKGROUND OF THE INVENTION

In recent years, the explosive demand for bandwidth over private (such as enterprise networks) and public (e.g. the Internet) communications networks has driven the development of very high-speed switching fabric devices. Indeed, such devices have allowed the practical implementation of network switching nodes capable of handling aggregate data traffic in a Gigabit (1.0E+09 bits) to Terabit (1.0E+12 bits) per second range. Even though many different approaches are theoretically possible to carry out switching at network nodes, a contemporary preferred solution is to employ, irrespective of the higher communications protocols actually in use to link end-users, fixed-size packet (also known as "cell") switching devices. These devices, which are said to be "protocol agnostic", have been found to be simpler and more easily tunable for performance than other solutions, especially those handling variable-length packets. Thus, N×N switches, which can be viewed as black boxes with N inputs and N outputs, have been made capable of moving short, fixed-size packets (typically comprising 64-bytes) from any incoming link to any outgoing link thereof. Many types of switching architectures have been proposed to implement the core of the switching fabric. One solution is to build the switching fabric around a very high speed switch crossbar device 100 as shown in FIG. 1, capable of establishing at a given instant, connections between any of its inputs to any of its outputs, thus, potentially allowing any data packet to be transferred from any switch input adapter 110 to any switch output adapter 120. However, such a device has no storage capability. Thus, a packet may not be admitted through the switch crossbar unless there is a provision to receive it in a destination output switch adapter 120, and provided that no two input packets contend for the same output. Such a device would require a central scheduler or arbiter 130 to decide which set of paths may be established at a given packet cycle so as to resolve conflicts in the use of the switch crossbar. Despite this difficulty, many commercial products using this approach have been made available. They need a central scheduler which, to make good decisions, has to acquire complete knowledge of what is going on in the adapters interfacing with the crossbar. As a consequence, a high speed communications bus 140 must also exist between the adapters and the scheduler. Also, an algorithm to schedule the departure of cells at each packet cycle is far from trivial and, moreover, decisions must be re-assessed at each cycle for the whole switch. Although much research work has been conducted in this area (see e.g., "iSLIP: A scheduling algorithm for input-queued switches, *IEEE/ACM Transactions on Networking*, vol. 7, no. 2, pp. 188-201, April 1999 by N. McKeown) and many algorithms proposed, what remains at stake is their complexity of implementation when applied to very high capacity switch fabrics.

Yet another problem with a crossbar implementation is an inability to natively support multicast traffic. In fact, when a packet must be sent to more than one destination, the central scheduler must wait until all corresponding crossbar outputs can be freed in a same cycle. This is a serious drawback which makes the central scheduler even more complex to design and may sometimes require that multicast be supported only from the input adapters themselves. In this case, the input adapters have to replicate the sending of a same packet through the switch fabric, as many times as necessitated by the scope of the multicast (and possibly to all output ports in the case of a broadcast).

A typical example of a commercially available crossbar architecture switch, and how the aforementioned problems are actually handled can be found in data sheets (especially in 'High Performance 16×16 Serial Crosspoint Switch', G52191 Rev. 4.2, dated Jan. 5, 2001) and application notes (especially in AN-32 G530030 Rev. 4.0, dated Jul. 5, 1999) for VSC870 and VSC880 that are commercially available building blocks by VITESSE Semiconductor Corporation (741 Calle Plano, Camarillo, Calif. 93012, the USA) and are intended to be used to build a switch fabric of the type discussed above.

Another approach to building a switch fabric is shown in FIG. 2. It is different than that shown in FIG. 1 as it assumes that all entering packets 200, coming into the switch fabric through any input port, are temporarily stored in shared memory 210 before exiting the switch fabric as exiting packets 220 over the output ports. This approach does not have the drawback of the switch fabric shown in FIG. 1 as a packet may be admitted in the shared memory (i.e. the switching medium) even though a corresponding output is not yet available. This provides a great deal of freedom in the admission of incoming packets. Accordingly, there is no longer a strong requirement for a central scheduler. In a manner different than the approach shown in FIG. 1, each input adapter may decide on its own to let a packet in, as long as it is globally permitted to do so through a granting and/or back-pressure mechanism from switch core 230, and as long as there is enough room left in the shared memory. Therefore, the shared memory has a controller 235 whose role, however, is limited to attribute and release buffers depending on the observed movement of incoming and outgoing packets. The decision to let a packet go out is made by individual output queues 240 which only need to contain a pointer to a buffer where a particular packet has been stored upon entering the switch fabric. This scheme works well for multicast also, as a single copy of a packet may be temporarily stored in the shared memory while multiple copies of pointers are made in various output queues. In this case, the corresponding buffer may not be released until the last copy of the same packet has been made. However, there is no longer the drastic requirement of multiple copies of the packet having to exit the switch fabric in a same packet cycle. Each output queue may freely schedule the departure of a packet depending on its own load.

However, the scheme shown in FIG. 2 has some practical limitations when trying to implement large and very high speed switch fabrics of the terabit class switching equipment now in demand. Because the memory is shared, it must be shared either spatially, by allowing multiple ports, and/or time shared by all input and output ports trying to access, substantially simultaneously, a common resource. A typical contemporary design point for a switch fabric is a 64×64 port switch with each port capable of sustaining full duplex 40 Gigabits/second traffic (for example, an OC-768 of the SONET hierarchy) such that the committed aggregate bandwidth is 64×40=2.5 Terabits/second in full duplex mode. In practice, however, ports must be designed with an overspeed factor so as to absorb bursts of traffic, and therefore have an actual speed at least 50% higher such that the true port speed is about 64 Gigabits/second. For 64-byte packets this assumes that every 8 Nanoseconds (hereinafter referred to as "Ns") a packet must unconditionally enter and leave each of the 64 ports. In the case of time sharing, this would imply a memory cycle of 8/2×64=62.5 picoseconds.

Even if memory can be implemented with several sets of ports, for example two write ports and two read ports, a sub-nanosecond cycle timing requirement is still very difficult to achieve with current technology, in one example CMOS. Consequently, the concept of shared memory, while very attractive, does not scale up to the terabit class of switches.

On the other hand, if using a crossbar approach as described hereinabove, the challenge is reconfiguration of the array at a rate of once every 8 Ns. If the task of reconfiguring the switching matrix is considered alone, this is more easily achievable than the above challenge of being able to time share a common memory at a sub-nanosecond cycle, however, the problem with a crossbar is that of making a decision in a central scheduler every 8 Ns as to how the 64×64 switch crossbar should be best reconfigured. This presents another very difficult challenge due to the complexity of the algorithms to be carried out, and because of the huge exchange of information that this would assume between a central scheduler and all the adapters.

Finally, it should also be pointed out that implementing a packet switching function imposes another difficult challenge which is the overall control of all the flows of data entering and leaving a switch. Whichever method is adopted, an assumption is made that packets may be temporarily held at various stages of the switching function so as to handle priority flows supporting Quality of Service (hereinafter referred to as "QoS") and to prevent congestion from occurring. Many schemes have been proposed to achieve such a result. Some of these assume that traffic may be held in input queues (i.e. in adapters before entering the switch fabric), in output queues (i.e. upon leaving the switch fabric), within the switch fabric itself, or in a combination such as the Combined Input/Output Queuing (also known as "CIOQ") scheme utilized in many contemporary switch architectures. Irrespective of any particular solution, as a general statement, it may be said that it always helps to have ample storage to prevent cell discarding in case of congestion and, generally stated, this greatly eases flow control. This remark not only applies to input or output queues in switch adapters, but is also valid for a switch fabric itself. A switch fabric should be capable of holding a significant amount of packets when necessary, especially with dramatic increases in port speed, as many more cells are likely to be received before control of a particular flow entering a switch port becomes effective. Thus, using a storage-less crossbar as a switch fabric, in addition to the problems mentioned hereinabove, does not provide help with flow control either.

It is believed, therefore, that a data packet switch which provides the many advantages taught herein would obviate many of the problems and limitations described hereinabove, and would constitute a significant advancement in the art.

OBJECTS AND SUMMARY OF THE INVENTION

It is a primary object of the present invention to enhance the art of data packet switches.

It is another object of the invention to provide a data packet switch which functions in a new and unique manner, compared to known such systems.

It is yet another object of the invention to provide a switch architecture that allows implementation of a terabit class switch fabric utilizing current technology.

It is yet another object of the invention that a central scheduler or arbiter is not required.

It is yet another object of the invention that multicast may be supported.

It is yet another object of the invention to ease overall flow control.

It is yet another object of the invention that the switch fabric may be easily wired.

In accordance with one embodiment of the invention, there is provided a data packet switch having a plurality of input and output ports comprising switch fabric for steering data packets from any one of the input ports to any one of the output ports, including a dynamic memory buffer associated with each connection between the input and output ports, each of the dynamic memory buffers being adapted to store at least one data packet for a minimum specified storing time period, writing structure adapted for writing the data packet in all of the dynamic memory buffers connected to the input ports through which the data packet is received, and reading structure adapted for reading only once the data packets from selected ones of the dynamic memory buffers connected to the output ports through which the data packets are to be transmitted, before the minimum specified storing time period of the data packets has elapsed.

In accordance with another embodiment of the invention, there is provided a method for operating a data packet switch having a plurality of input and output ports, the method comprising steering data packets from any one of the input ports to any one of the output ports, including a dynamic memory buffer associated with each connection between the input and output ports, each of the dynamic memory buffers being adapted to store at least one data packet for a minimum specified storing time period, writing the data packet in all of the dynamic memory buffers connected to the input ports through which the data packet is received, and reading only once the data packets from selected ones of the dynamic memory buffers connected the output ports through which the data packets are to be transmitted, before the minimum specified storing time period of the data packets has elapsed.

BRIEF DESCRIPTION OF THE DRAWINGS

The above and other objects, features and advantages of the present invention will be better understood by reading the following more particular description of the invention in conjunction with the accompanying drawings wherein.

BEST MODE FOR CARRYING OUT THE INVENTION

Figure 1:
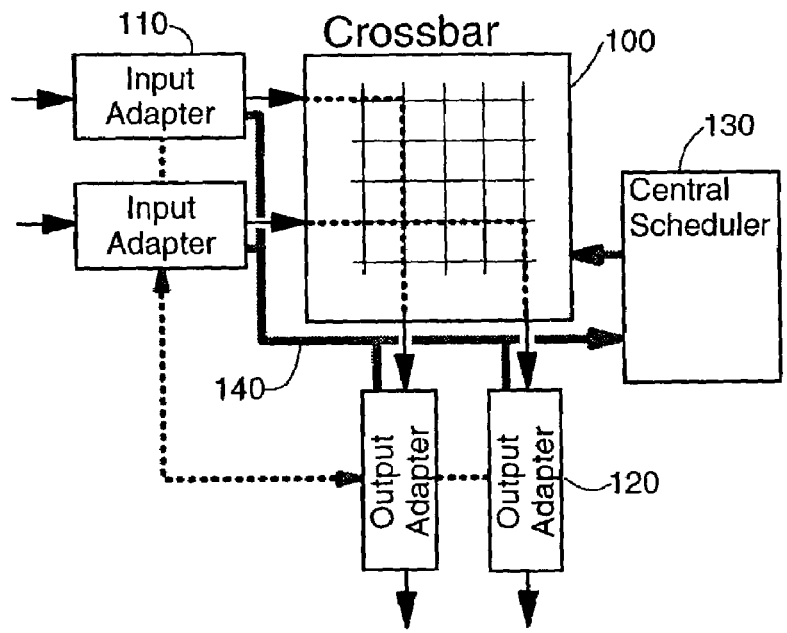
FIG. 1 is a schematic diagram showing a switch fabric that utilizes a high speed switch crossbar device according to the prior art.
Figure 2:
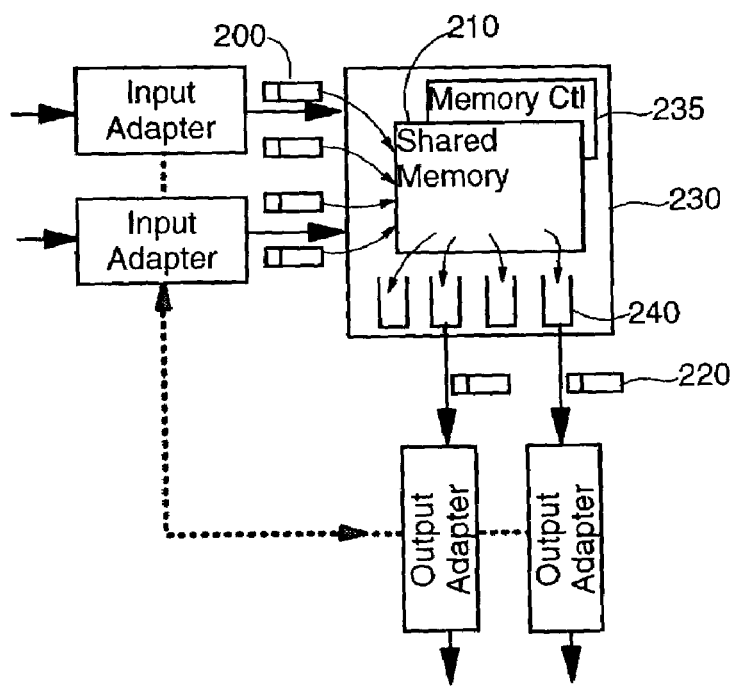
FIG. 2 is a schematic diagram showing a switch fabric that utilizes a shared memory according to the prior art.
Figure 3:
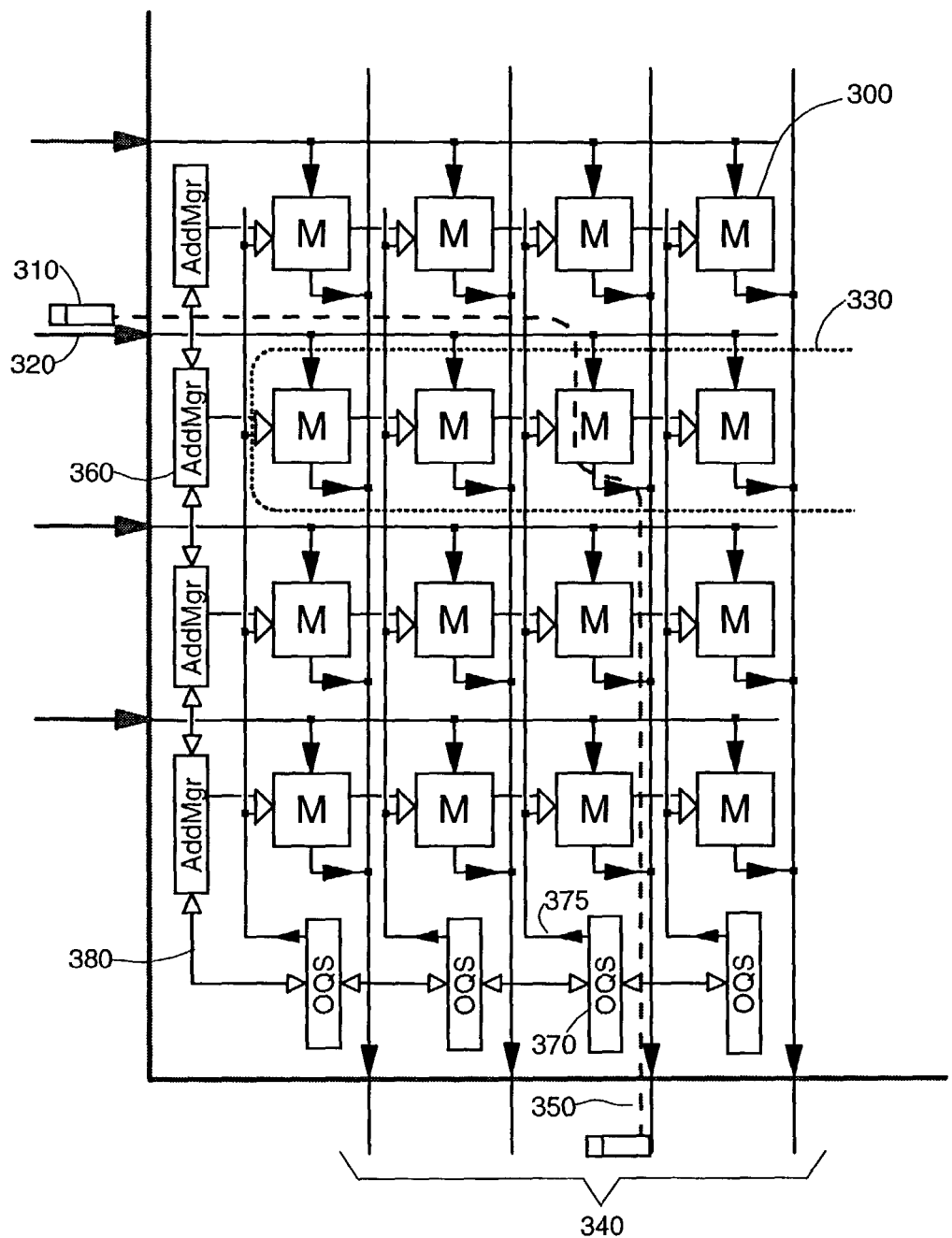
FIG. 3 is a schematic diagram showing a switch fabric according to one embodiment of the invention.

FIG. 3 shows the overall organization of a switch fabric according to one embodiment of the invention. Although a 4×4 array of dynamic memory buffers 300 is shown here for illustration purposes, it should be understood that any other array size, to which the principles of the invention described in FIG. 3 and following Figures could be applied, may be considered as well. The largest array size to be considered is only limited by practical considerations due to physical limitations imposed by a particular implementation such as, for example, the number of available I/O's of a particular type of packaging or the total amount of memory that may be placed on a single chip. As can be seen in FIG. 3, there is a dynamic memory buffer associated with each connection between an input port and an output port, as well as a set of dynamic memory buffers associated with each input port being organized, in one example, as a row, and a set of dynamic memory buffers associated with each output port being organized, in one example, as a column.

The invention assumes that when a packet 310 is received through an input port 320, it is written in all individual buffers of the corresponding row of memory buffers 330 in order to have a copy of the incoming packet ready to go through any output port 340. Thus, the switch fabric described herein is capable of steering data packets from any one of said input ports to any one of said output ports. Furthermore, in the case of unicast traffic, which is the general case, only one copy of the incoming packet is actually used. The copy that is used is the one which is in the buffer at the intersection of the row of the input port and the column corresponding to the output port through which it is due to exit the switch fabric, for example, following path 350. This scheme naturally supports multicast traffic as all output ports, through which a packet must exit, hold their own copy of an incoming packet. Thus, when all useful copies (i.e. the 1 to N copies corresponding to the output ports through which an incoming packet exits the switch fabric) have actually been used, address manager (hereinafter referred to as "AM") 360 of a given row of buffers may release a corresponding buffer address (substantially identical in all the memory buffers) such that it is available for a new incoming packet. Useful and not useful copies of an incoming packet are then just overwritten with a new packet which arrives later. The decision to let a packet go out is made on a column basis (i.e. per output port). Thus, there is an Output Queue Scheduler (hereinafter referred to as "OQS") 370 per column to arbitrate between the packets waiting to go for that column through the associated output port. In this scheme, OQS's 370 and AM's 360 exchange information 380 such that a pointer to where an incoming packet is actually stored is passed to the relevant OQS's upon a packet entering the switch fabric. This pointer is passed back to a respective AM which can release the corresponding buffer address after the last copy of a packet has been forwarded.

In general, there is possibly one packet arriving on each input port and one packet possibly leaving on each output port in one packet cycle, in one example every 8 Ns, if ports comply with the speed specifications of an OC-768 of the SONET hierarchy as discussed hereinabove in the background section.

As stated hereinabove, writing may be performed in all memory buffers of a given row in which case there will be, in general, useless copies of the incoming packet. Thus, an alternate solution may comprise writing into only those individual memory buffers that need to actually have a copy of the incoming packet. This need is known in advance because there should be enough information in the incoming packet (generally, in the packet header) to know through which port(s) this packet should exit the switch fabric. This alternate solution provides a practical advantage, as less power would be dissipated since only useful copies of the incoming packet are actually copied into corresponding buffers. It should be noted that unused buffers may not be reused as there is a common AM for a given row of buffers to keep management of the buffers simple and efficient such that the aforementioned packet cycle may be met. Thus, from the view point of the mode of operation, the result is substantially the same. Whether only useful copies are actually made or all buffers are copied into, the result is substantially the same as there is one copy made available for each output port through which a packet must be forwarded. This may be a single copy in the case of unicast, multiple copies in the case of multicast or possibly all buffers of a given row are copied if a packet must be broadcast. Implementing a solution where only useful copies of packets are made requires individual control of writing into memory buffers along a row, while writing to all buffers (i.e. writing useful and useless copies of a packet), assumes a single write command per row.

Reading of a packet going out from the switch fabric is done in each column under control 375 of OQS's. In the general case, packets going out have to come from memory buffers in different rows depending upon how OQS's have performed arbitration. However, in all cases there is only one read performed per column and per packet cycle. If, however, two or more OQS's decide to select the same address in a same row of memory buffers, this is because a multicast is going to be handled in a same packet cycle. However, this is purely a matter of chance as each OQS is working independently of the others in a given column.

Figure 4:
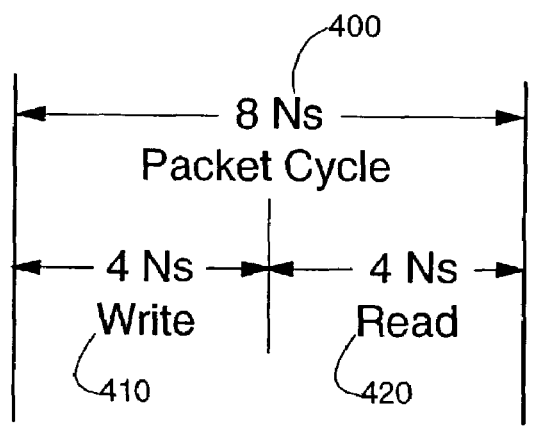
FIG. 4 is a diagram showing timing utilized to read and write an array of memory buffers according to one embodiment of the invention.

In FIG. 4, there is shown a mode of operation of the switch fabric regarding timing to read and write the array of memory buffers. At each 64-byte packet cycle 400, in one example 8 Ns, a high speed switch fabric used, by way of example, to explain the invention, and in which ports comply with the speed specifications of an OC-768 line of the SONET hierarchy, a packet may be written in each row from the input ports and a packet may be read in each column to the output ports within this cycle time. Thus, there are 4 Ns respectively for write 410 and read 420 operations sharing the packet cycle time. Hence, having distributed the memory at each cross-point of the memory array, memory timings are relaxed and it is, therefore, feasible to implement memory with a current technology, in one example CMOS.

However, as discussed hereinabove in the background section, this is very difficult to implement with a standard shared-memory approach which assumes, contrary to the invention, that more than one, and possibly all, input/output port pairs share a common memory resource. This structure, however, is realized at the expense of an overall larger memory requirement which must be accommodated as explained hereinbelow with reference to FIG. 5.

Figure 5:
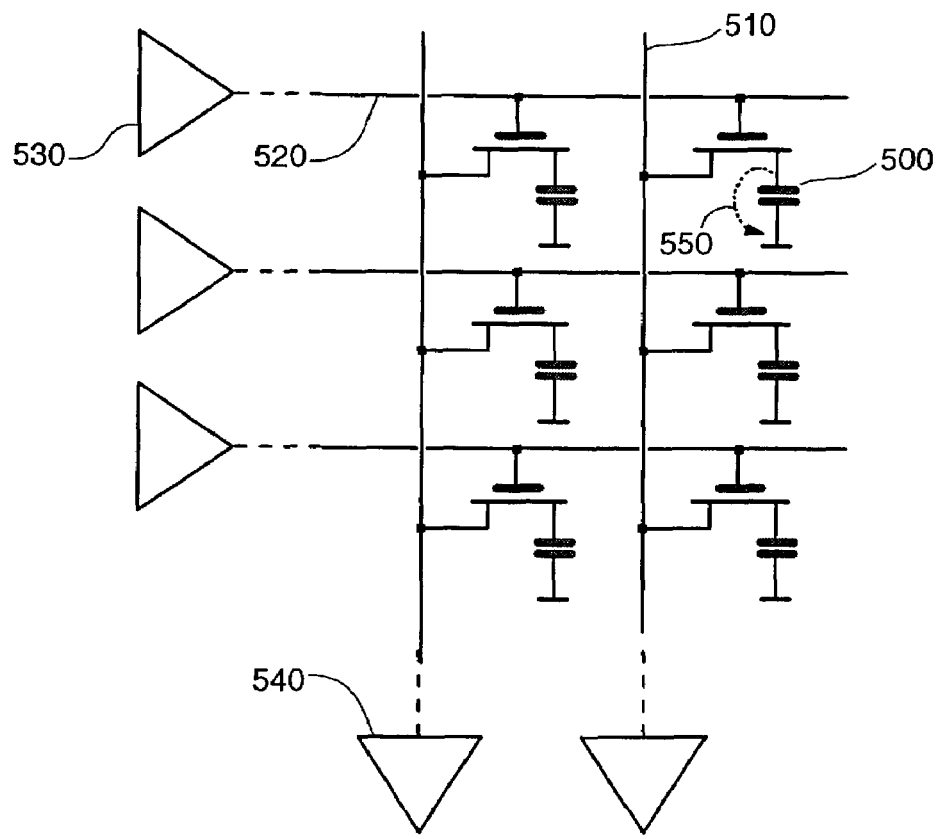
FIG. 5 is a schematic diagram showing a type of memory buffer utilized according to one embodiment of the invention.

In FIG. 5, some significant features of the invention are shown. Firstly, the observation is made that one purpose of a switch fabric is to move packets as quickly as possible. Generally stated, the shorter a packet stays within the switch fabric, the better. Even if, as discussed hereinabove in the background section, storing packets in the switch fabric itself adds a great deal of flexibility, it is generally not desirable to have a packet stay within the switch fabric for an extended period of time unless an output port becomes congested. In the case of congestion, some packets, that were permitted to enter the fabric, may get trapped before overall switch flow control has a chance to pace the entering traffic flows contending for a given output. Accordingly, the storage of a given fabric may well be comprised of a dynamic (non-permanent) type of memory. Indeed, dynamic RAM (hereinafter referred to as "DRAM"), for example, is known to be much denser than its static counterpart, although its use and timings are more challenging. DRAM must be refreshed periodically to restore the contents thereof which tend to fade, as memory elements therein are little more than very small capacitors which naturally leak. However, there is no such need to perform a refresh in a switch fabric since, as observed hereinabove, a packet should leave the switch as quickly as possible. This mode of operation is quite different than the mode in which DRAM has traditionally been used such as the active memory of computers where stored information may stay for an extensive period of time, for example, as long as a computer is up and running. This requires an internal refresh to be performed regularly. Typically, a charged capacitor storing a '1' bit must be refreshed every 4 milliseconds (hereinafter referred to as "ms"), during which time it becomes unavailable (availability of DRAM is less than 100%). Thus, a dynamic memory buffer so implemented is adapted to store a data packet for a minimum specified storing time period which is equal to or less than a time period, after which, a refresh is needed, in one example about 4 ms.

A second observation is that a packet, once written in the array of memory buffers, needs to be read only once. With the proposed structure, this is true even for multicast packets since each crossing in the memory array holds its own copy of the incoming packets to be multicast through more than one output. Consequently, another problem associated with standard DRAM is obviated, to wit, reading of the capacitors that hold stored information is destructive. These capacitors are so small that their informational content is destroyed upon reading. Therefore, DRAM circuitry must provide for a regeneration of a stored level at each reading. This adds to the complexity of DRAM, and is a detrimental factor that contributes toward making DRAM slower than its static counterpart. Therefore, because switch fabric requires only a single reading of stored information, a device in charge of evaluating the contents of the capacitors need not restore the contents thereof, and thus, can perform a simple and fast destructive read out (hereinafter referred to as "DRO").

Therefore, what is needed to implement a switch fabric according to the invention is a refreshless DRO array of capacitors which can be made even denser and faster than a traditional DRAM array and thus compensate for the larger amount of memory that is needed to implement the switch structure per the invention. Accordingly, the switch fabric may be organized as an array of small capacitors 500 in a manner similar to a traditional DRAM. A capacitor is selected when a row buffer 530 selects a row line 520 and, what is generally called a bit line 510, such that capacitor 500 can be written and read through, what is referred to as a sense amplifier 540 which is able to "sense" a charge contained in a capacitor albeit, destroying the charge. These components 510, 520 and 530 thus serve as a writing structure, and sense amplifier 540 thus serves as a reading structure. Again, by allowing DRO and not requiring a refresh, the memory has significantly higher availability, and is of a design that is simpler and faster. However, reading must occur before a capacitor is discharged by leakage current 550. This is further explained hereinbelow with reference to FIG. 6. The circuitry shown in FIG. 5 is intended to be just a sketch of circuitry used in one possible implementation, to wit, a DRAM capacitor array; other implementations are certainly possible.

Figure 6:
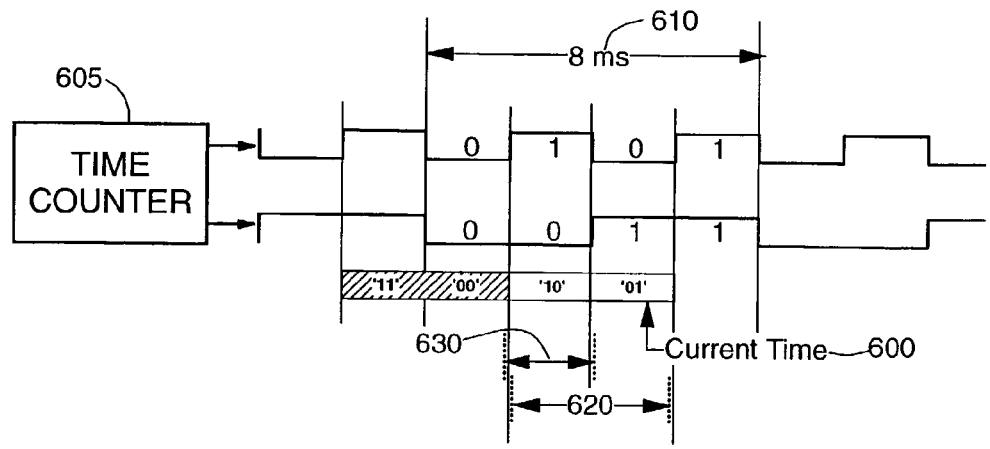
FIG. 6 is a diagram showing fading of information stored in memory buffers according to one embodiment of the invention.

In FIG. 6, fading of information temporarily stored in an array of capacitors is shown. First, the time which may elapse before stored packet information needs to be refreshed versus the fabric packet rate is compared. Generally, capacitors in DRAM must be refreshed not later than a few ms (typically, 4 ms is specified) after information has been written in or read from a standard DRAM as reading from such a device causes regeneration of stored levels of accessed capacitors to be performed, as discussed hereinabove. Therefore, given that one packet may be processed through an input and output port every 8 Ns, a half million (4.0E−03/8.0E−09=0.5E+06) packets may be processed in 4 ms. Thus, the probability that a packet entering the switch fabric has not left after 4 ms may be considered as quite low. Whatever type of overall flow control mechanism is used within a switch fabric according to the invention, it is unlikely that a packet would still be left in a given memory buffer after 500,000 other packets have been processed through the particular output port to which this memory buffer is connected. Thus, the problem of information fading may be obviated through the implementation of a flow control mechanism that would provide an upper bound as to how long a packet may stay within the fabric that would be equal to or less than the aforementioned 4 ms time period, or whatever other time period may be specified.

As described hereinabove, each OQS receives, soon after a packet has been placed in a memory buffer by an input port AM, a pointer indicating where the corresponding just received packet is stored. As the name suggests, an OQS (output queue scheduler) is in charge of scheduling the departure, through the output port to which it is connected, of all packets that have been en-queued by various input port AM's having to forward a packet through that particular output port. Upon receiving a pointer, a OQS adds a time stamp (hereinafter referred to as "TS") to it before en-queuing. Accordingly, the TS is associated with the packet indicated by the pointer. This may be a rough TS that would come, in one example, from a 2-bit time counter 605 with an 8 ms period (which corresponds to a refresh time period of the dynamic memory buffers, in one example about 4 ms), and which would make it possible to easily check that a packet does not stay more than a time comprised between about 2 and 4 ms in a column of memory buffers. Thus, data packets are transmitted from a selected set of dynamic memory buffers connected to output ports before said minimum specified storing time period of the data packets, in one example between about 2 and 4 ms, has elapsed. In the present example, if current time 600 is somewhere in the third quarter of 8 ms period 610 of time counter 605, then OQS pointers carrying a corresponding TS of '01', or ones carrying an immediate previous TS of '10' correspond to packets that are not older than 4 ms 620. However, if a OQS pointer carries a TS of either '00' or '11', then it is at least 2 ms old or older 630, and should be considered to be too old.

Figure 7:
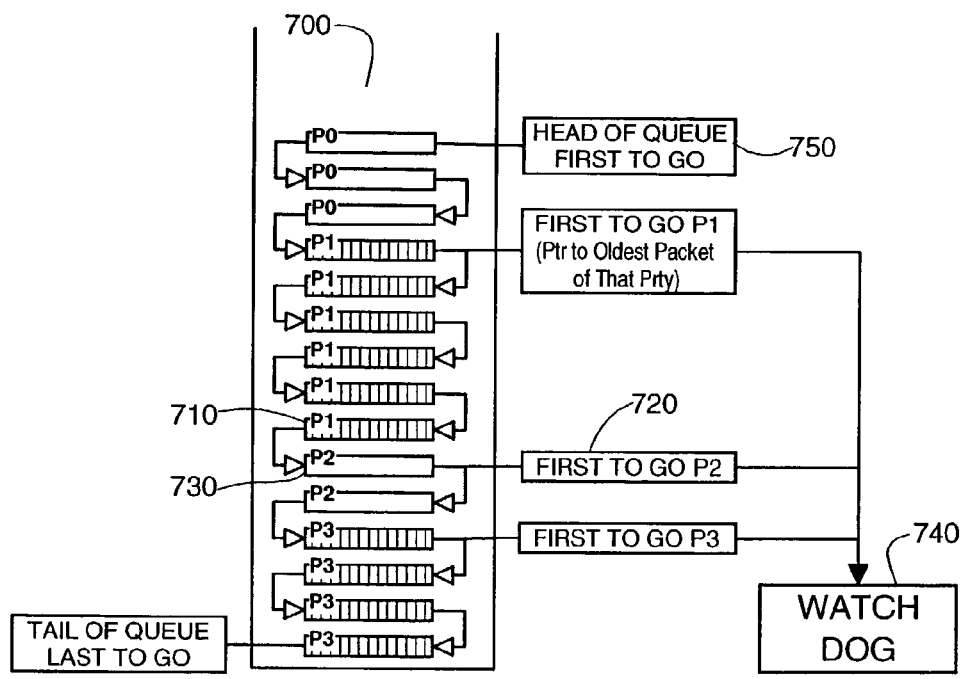
FIG. 7 is a diagram showing output queue scheduler organization according to one embodiment of the invention.

In FIG. 7, there is shown one possible exemplary organization of an OQS. This example provides an explanation as to how TS are used to prevent packets from staying in the switch fabric longer than the memory buffer refresh time. An OQS comprises a linked list 700 of all pointers that it has received from AM's. Inasmuch as most switch fabrics must support priorities in order to achieve a quality of service (also known as "QoS") expected by many applications, the linked list (hereinafter referred to as "queue") is organized by priorities. Thus, whenever a new pointer is forwarded by one of the AM's, it is inserted in a "last to go" position of the corresponding range of priority to which it belongs. If, for example, a pointer for a packet of priority 1 (shown in FIG. 7 as "P1") is received, it is inserted as last received 710 for that priority, or just in front of FIRST TO GO P2 720 of the next lower priority (shown in FIG. 7 as "P2"), which is the oldest of that priority category. Last received 710 will be processed accordingly, that is, it will be forwarded after all of priority 0 (shown in FIG. 7 as "P0"), the highest priority in this example, have been forwarded, and after all in front of it at priority 1 are also forwarded. This is highly dynamic, and the queue is constantly evolving depending on the arrival of new pointers at various priorities, and the departure of packets, done from highest to lowest priority and in order of their arrival with the oldest packet first (also known as "OPF"). Four priorities 0-3 are assumed in this example; these priorities are shown as P0, P1, P2 and P3, respectively, in FIG. 7. It should be noted that not all priorities are necessarily present in the queue at a given instant, and that the queue is empty when there is no longer anything to transmit. Thus, with this scheme, it is theoretically possible that, at any given instant, a lower priority packet, in one example packet 730, is authorized to enter the fabric and, immediately thereafter, a long burst (lasting for more than 4 ms) of higher priority packets are continuously received for that output port, thus preventing lower priority packet 730 from exiting the fabric in a timely manner.

To handle such a situation without having to rely on overall flow control, watch dog 740 is implemented in each OQS such that, at regular time intervals, the oldest packet pointer at each level of priority in the queue, but not that of the highest priority or HEAD OF QUEUE 750, have their TS checked to determine if the corresponding packets would require a refresh. Given that a refresh is not possible within the dynamic array of the invention, any such corresponding packet is prioritized unconditionally and forced to HEAD OF QUEUE 750 such that it exits the switch fabric at a next packet cycle. This scheme assumes that trapping of a packet in the fabric is a result of a burst at a higher priority, and not the blocking of an output port. Therefore, packets of priority 0, or of the highest priority active at a given moment, have precedence, and are always transferred to an output port first by the switch fabric, so HEAD OF QUEUE 750, which is the oldest packet at the highest active priority, need not have its TS checked.

It should be noted that design and management of queues such as queue 700, and design of a watch dog such as watch dog 740, utilize standard techniques and logic circuitry which are known, and further description in not believed necessary.

Figure 8:
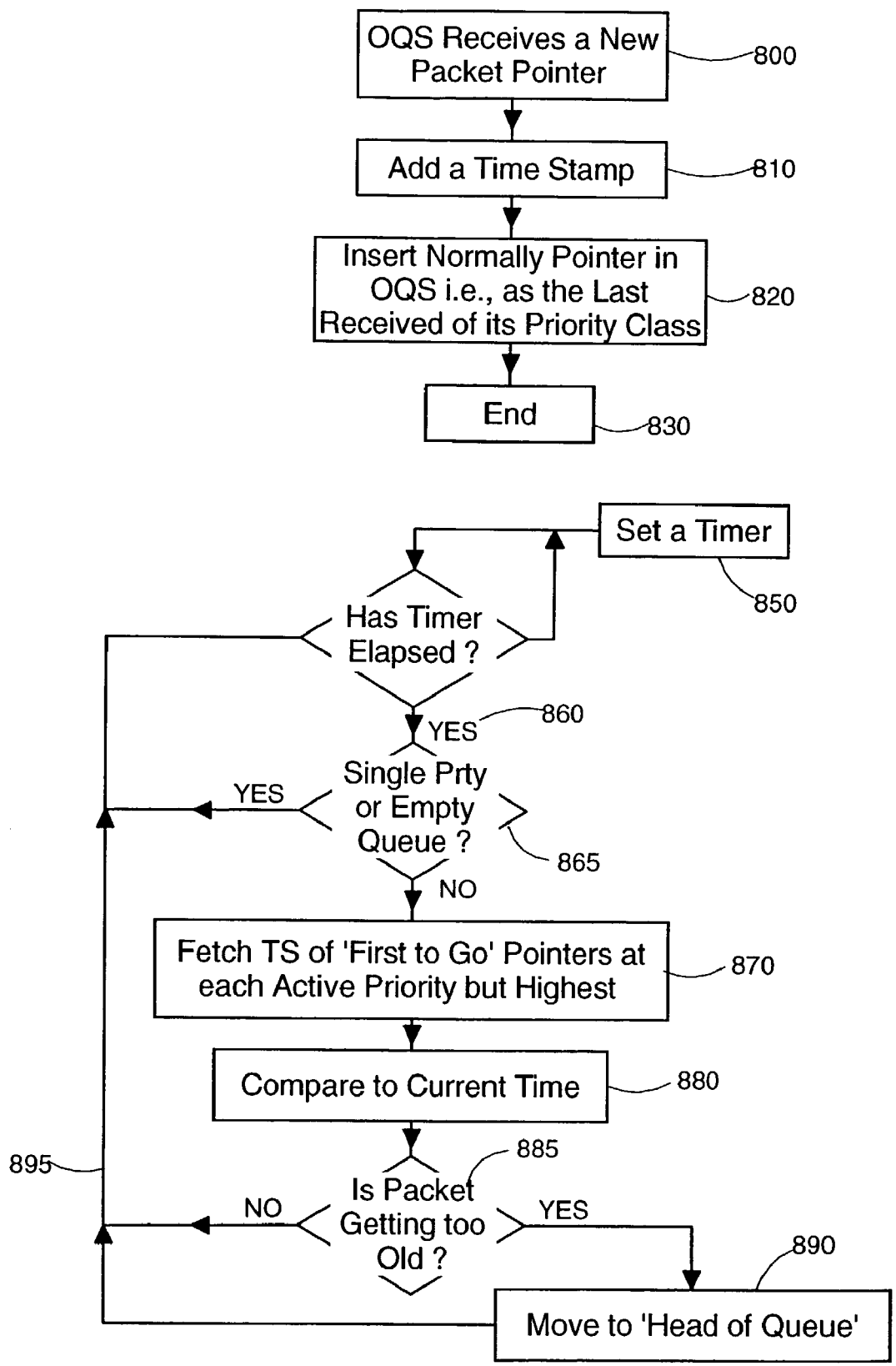
FIG. 8 is a flow diagram showing the steps of a method to force out a packet according to one embodiment of the invention.

In FIG. 8, there are shown the steps of a method to force out a packet that would otherwise require a refresh.

An OQS, upon receiving a new packet pointer from an AM in step 800, adds a TS to it in step 810 that corresponds to the current value of a time counter, as described hereinabove with reference to FIG. 6. The pointer is then normally inserted in an OQS queue in step 820, as described hereinabove with reference to FIG. 7, and this part of the process ends in step 830. Pointers are then processed by OQS circuitry without regard to TS.

A timer is set in step 850 to allow examination of pending pointers in each OQS at regular time intervals. When the timer has elapsed in step 860, OQS is checked in step 865 to determine if it contains pointers of only one priority, or is empty. If not, pointers of the oldest packets (also known as 'First to Go') at each priority level currently in OQS, except for the pointer of highest priority, have their TS fields fetched in step 870 by the watch dog as described hereinabove with reference to FIG. 7. Recorded TS are compared in step 880 to a current time value obtained from the time counter. If it is determined in step 885 that a packet is getting too old (i.e. the difference between TS and the current time value has reached or exceeded a predetermined threshold), then the pointer is unconditionally prioritized and moved to the 'Head of Queue' in step 890. Processing then resumes at step 895.

Figure 9:
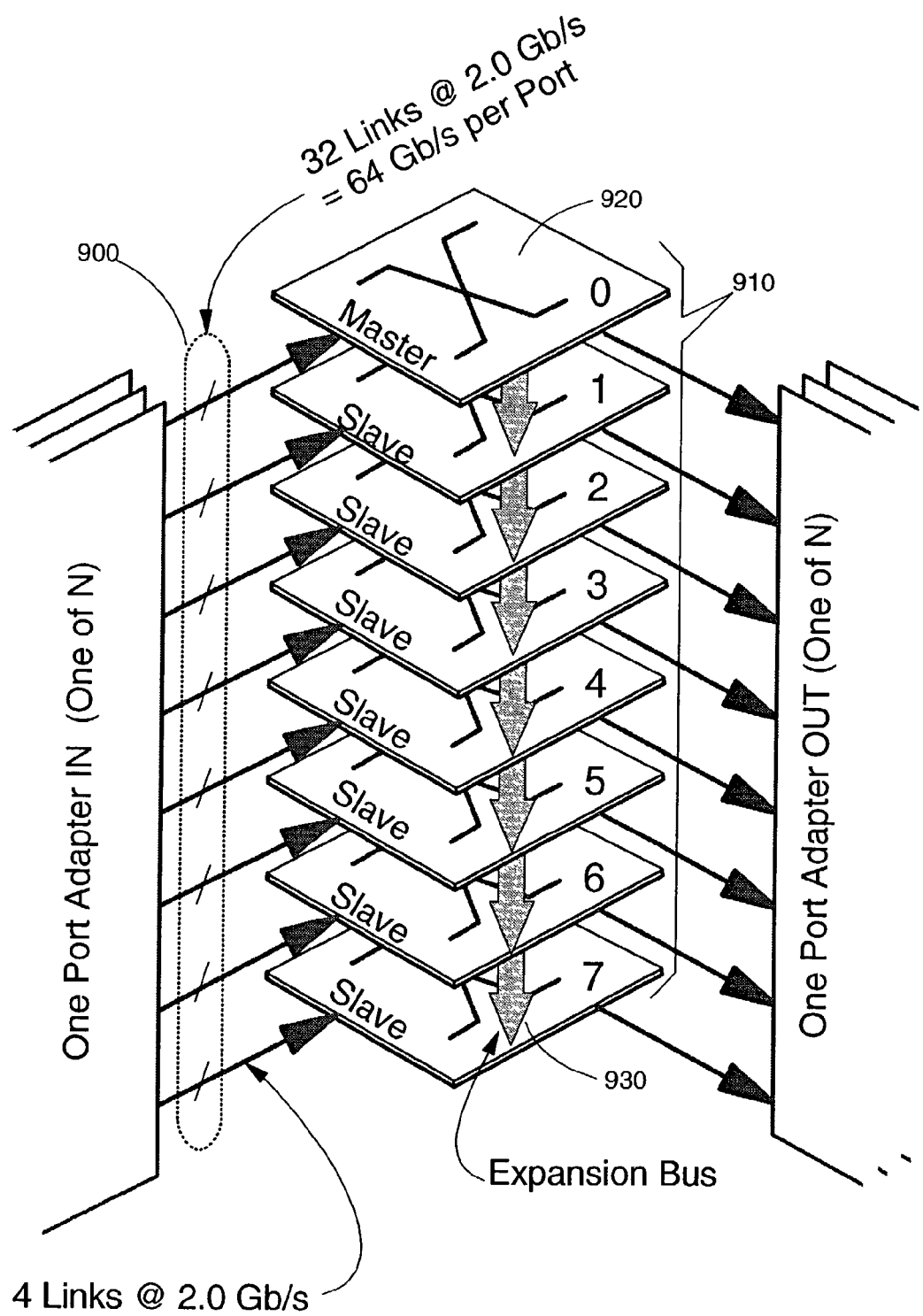
FIG. 9 is a diagram showing a switching system according to one embodiment of the invention.

In FIG. 9, there is shown a view of a switching system according to one embodiment of the invention. A terabit class of switches considered herein, by way of example, is characterized by the use of a large number of high-speed serial links. Serial links in current use operate at a speed of up to about 2.0 Gigabits/second. These links are typically implemented with 2.5 Gigabits/second links using 8B/10B encoding, resulting in a 20% overhead, to allow correct propagation of signals transmitted thereon. Thus, 32 such links 900 are needed per port to realize a 64 Gigabits/second throughput that is comparable to the level of performance of, in one example, an OC-768 (40 Gigabits/second) on each port with an over-speed factor of at least 50% as discussed hereinabove. The switch fabric is organized as planes or slices 910, with eight such slices shown, for example, in FIG. 9. Each slice handles, at every packet cycle, or 8 Ns, a respective fraction of a data packet, in one example, one-eighth of a 64-byte packet, or 8 bytes. This structure allows accommodation of the large number of I/O's that are necessary to handle an aggregate throughput measured in Terabits/second. This throughput is achieved using parallel processing of packets such that a packet is processed on each input and output port every 8 Ns. The input and output ports are shown as IN and OUT, respectively, in FIG. 9. This structure also allows the amount of memory needed to simplify flow control within the switch fabric to be kept at a reasonable level.

Hence, with this approach upper slice 920 is a Master, implementing AM's and OQS's described hereinabove, and which sends control information to all other slices (also known as "Slaves"), to allow storage of their respective fraction, or "chunk" of each packet, through Expansion Bus 930. To allow storage of, for example, up to 128 packets at each cross-point within a switch fabric, 128 packets×8 bytes×8 bits/byte, or 8192 bits of memory buffer must be provided for each pair of input/output ports in each slice. Accordingly, for a 64×64 switch fabric, a total of 64×64×8K bits or 32 Mb of memory per slice would be needed. Given current sub-micron CMOS technology, it is certainly possible to place such an amount of memory within the dynamic array of the invention. Thus, ample internal storage may be made available at each cross-point in the array, thereby enabling a simple distributed flow control for a terabit class switch fabric having a large number of ports. Memory timing utilized by the invention may also be realized using current CMOS technology.

While there have been shown and described what are at present the preferred embodiments of the invention, it will be obvious to those skilled in the art that various changes and modifications may be made therein without departing from the scope of the invention as defined by the appended claims.

What is claimed is:

1. A method for operating a data packet switch having a plurality of input and output ports, said method comprising:
   steering data packets from any one of said input ports to any one of said output ports, including a plurality of refreshless dynamic memory buffers associated with a plurality of connections between said input and output ports, one refreshless dynamic memory buffer per connection, each of said refreshless dynamic memory buffers being adapted to store at least one data packet for a minimum specified storing time period;
   writing said data packet in all of said refreshless dynamic memory buffers connected to said input ports through which said data packet is received;
   reading only once said data packets from selected ones of said refreshless dynamic memory buffers connected to said output ports through which said data packets are to be transmitted, before said minimum specified storing time period of said data packets has elapsed;
   setting a time stamp associated with said data packet to a current time value upon receiving said data packet;
   comparing said time stamp associated with said data packet to a current time value upon checking, at regular time intervals, said time stamp; and
   prioritizing unconditionally said data packet to force out said data packet from said data packet switch if a time difference between said time stamp associated with said data packet and said current time value reaches or exceeds a predetermined threshold.

2. The method of claim 1 wherein said checking is performed independently in each set of said refreshless dynamic memory buffers associated with said output ports.

3. The method of claim 1 wherein said comparing said time stamp associated with said data packet to said current time value is performed only if said data packet and at least one other data packet are substantially simultaneously stored in any one of each set of said refreshless dynamic memory buffers associated to said output ports.

4. The method of claim 1 wherein said current time value is determined according to a 2-bit time counter period.

5. The method of claim 4 wherein said 2-bit time counter period corresponds to a refresh period of said refreshless dynamic memory buffers.

6. A data packet switch having a plurality of input and output ports comprising:
   means for steering data packets from any one of said input ports to any one of said output ports, including a plurality of refreshless dynamic memory buffers associated with a plurality of connections between said input and output ports, one refreshless dynamic memory buffer per connection, each of said refreshless dynamic memory buffers being adapted to store at least one data packet for a minimum specified storing time period;
   means for writing said data packet in all of said refreshless dynamic memory buffers connected to said input ports through which said data packet is received;
   means for reading only once said data packets from selected ones of said refreshless dynamic memory buffers connected to said output ports through which said data packets are to be transmitted, before said minimum specified storing time period of said data packets has elapsed;
   means for setting a time stamp associated with said data packet to a current time value upon receiving said data packet;
   means for comparing said time stamp associated with said data packet to a current time value upon checking, at regular time intervals, said time stamp; and
   means for prioritizing unconditionally said data packet to force out said data packet from said data packet switch if a time difference between said time stamp associated with said data packet and said current time value reaches or exceeds a predetermined threshold.

7. The data packet switch of claim 6 wherein said checking is performed independently in each set of said refreshless dynamic memory buffers associated with said output ports.

8. The data packet switch of claim 6 wherein said comparing said time stamp associated with said data packet to said current time value is performed only if said data packet and at least one other data packet are substantially simultaneously stored in any one of each set of said refreshless dynamic memory buffers associated to said output ports.

9. The data packet switch of claim 6 wherein said current time value is determined according to a 2-bit time counter period.

10. The data packet switch of claim 9 wherein said 2-bit time counter period corresponds to a refresh period of said refreshless dynamic memory buffers.

* * * * *